United States Patent [19]

Michel

[11] Patent Number: 4,622,620
[45] Date of Patent: Nov. 11, 1986

[54] ELECTRIC CAPACITOR WITH POLYETHYLENE TEREPHTHALATE AS A DIELECTRIC FOR USE AS A SOLDERABLE CHIP COMPONENT

[75] Inventor: Hartmut Michel, Heidenheim, Fed. Rep. of Germany

[73] Assignee: Siemens Aktiengesellschaft, Berlin & Munich, Fed. Rep. of Germany

[21] Appl. No.: 717,729

[22] Filed: Mar. 29, 1985

[30] Foreign Application Priority Data

Apr. 3, 1984 [DE] Fed. Rep. of Germany ....... 3412463

[51] Int. Cl.$^4$ .......................... H01G 4/08; H01G 7/00
[52] U.S. Cl. .................................... 361/323; 29/25.42
[58] Field of Search ................ 29/25.42; 361/273, 323

[56] References Cited

U.S. PATENT DOCUMENTS

| | | | |
|---|---|---|---|
| 3,160,801 | 12/1964 | Haas et al. | 317/258 |
| 3,670,378 | 6/1972 | Behn et al. | 29/25.42 |
| 3,728,765 | 4/1973 | Behn et al. | 29/25.42 |
| 4,142,222 | 2/1979 | Kotschy et al. | 361/273 |
| 4,170,812 | 10/1979 | Rayno | 29/25.42 |
| 4,255,381 | 3/1981 | Eustance et al. | 264/519 |

FOREIGN PATENT DOCUMENTS

| | | |
|---|---|---|
| 1177220 | 4/1959 | France . |
| 318038 | 5/1956 | Switzerland . |
| 1138794 | 1/1969 | United Kingdom . |

OTHER PUBLICATIONS

IEEE Transactions on Electrical Insulation, vol. EI-15, No. 4, Aug. 1980, "Thermal Aging of Bi-Axially Oriented PET Films: Relation Between Structural Changes and Dielectric Behavior", by F. J. Morel et al., pp. 335-339.

Primary Examiner—Donald A. Griffin
Attorney, Agent, or Firm—Hill, Van Santen, Steadman & Simpson

[57] ABSTRACT

An electric capacitor formed of dielectric layers provided on at least one side with metal layers with coatings, and wherein the layers are formed of partially crystallized and pre-shrunk polyethylene terephthalate. The coatings are alternately electrically conductively connected to metal layers applied by the Schoop process with opposing polarity to end faces of the capacitor body. The dielectric layers are arranged to form a stack or are deformed to form a flat-pressed winding. The polyethylene terephthalate dielectric layers have a degree of crystallization of at least 50%, in particular at least 55%, measured by differential thermo-analysis in order to determine the melting point enthalpy. In a method for production of such a capacitor, the capacitor bodies provided with the metal layers are subjected to an additional heat treatment in which the temperature is increased from room temperature to a final temperature of 200° to 250° C. for 1 to 5 hours. This final temperature is held for a period of 1 to 65 hours, where the length of this holding time is inversely proportional to the final temperature.

12 Claims, 10 Drawing Figures

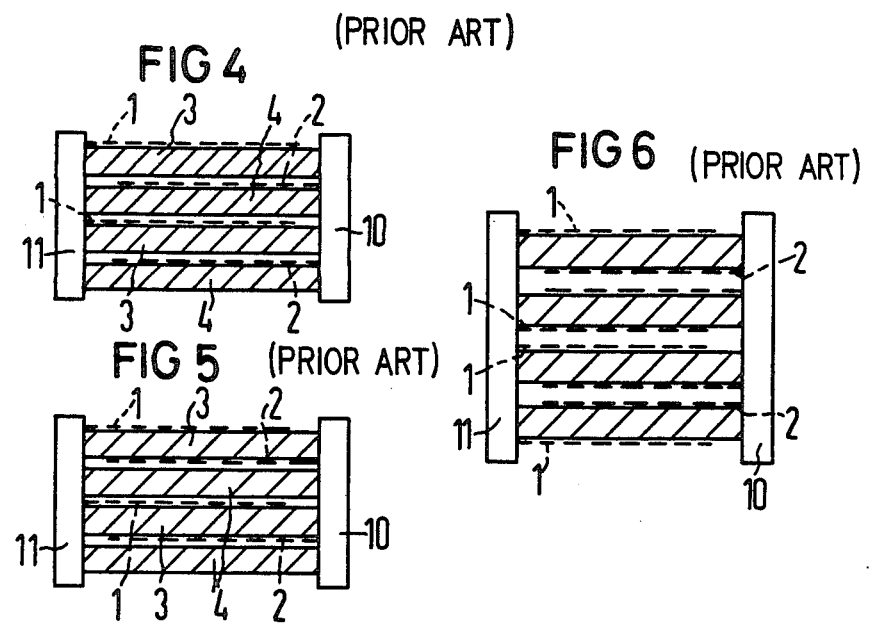
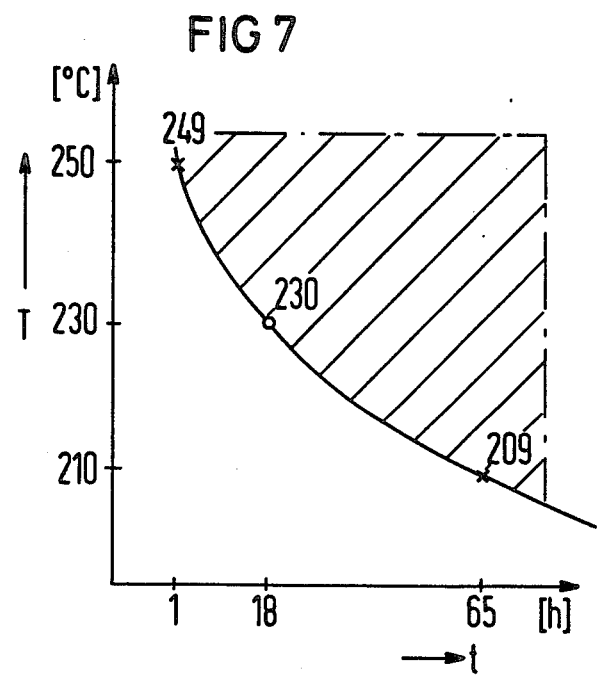

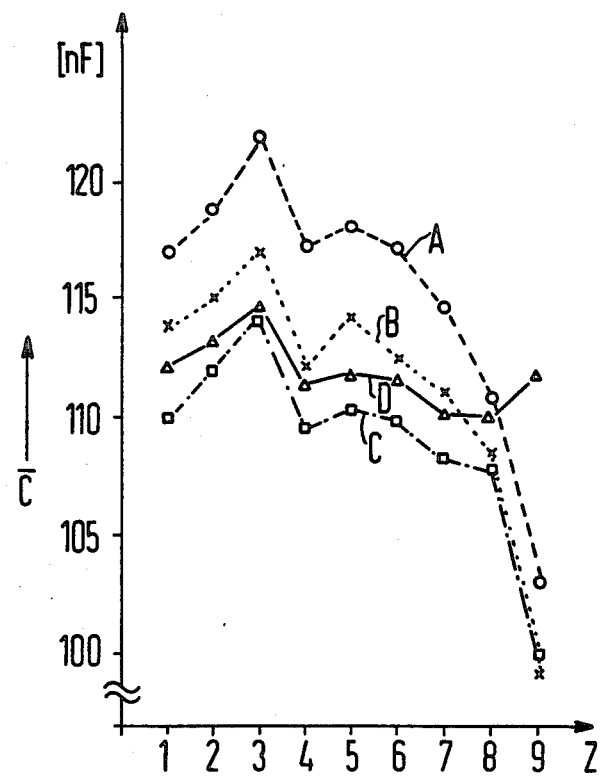

ELECTRIC CAPACITOR WITH POLYETHYLENE TEREPHTHALATE AS A DIELECTRIC FOR USE AS A SOLDERABLE CHIP COMPONENT

BACKGROUND OF THE INVENTION

The invention relates to an electric capacitor formed of dielectric layers provided on at least one side with metal layers as coatings, and which are composed of partially crystallized and pre-shrunk polyethylene terephthalate. The coatings are alternately electrically conductively connected to metal layers and are applied with opposing polarity to end faces of the capacitor body, particularly by the Schoop process. The dielectric layers are stacked or shaped to form a flat-pressed winding.

The invention further relates to a method for production of a capacitor for use as a solderable chip component, wherein from dielectric layers metallized on at least one side and composed of partially crystallized polyethylene terephthalate, capacitor bodies are produced which are formed of a round winding, and which are then shaped in a manner known per se to form a flat-pressed winding. The bodies are simultaneously preshrunk, and metal layers are applied to the end faces for contacting the coatings arranged alternately on the dielectric layers.

The invention further relates to a method for production of a capacitor, in particular for use as a chip component, wherein strips of polyethylene terephthalate metallized on at least one side, and having an edge cut in a wave formation, are applied in layers to a drum so as to form a starting capacitor. The starting capacitor is divided into the desired individual capacitors at right angles to the layer planes. Capacitively non-active intermediate layers are arranged on a number of dielectric layers and coatings which form at least one parent capacitor. The capacitively active dielectric layers with the coatings for the next parent capacitor are arranged on the intermediate layers. The starting capacitor formed in this way is provided with end contact layers, is then tempered on the drum at approximately 150° C., and is simultaneously compacted by preshrinkage. Only then is the starting capacitor divided into the desired individual capacitors in the region of the intermediate layers and in the direction at right angles thereto.

Capacitors in accordance with the present invention consist both of flat-pressed winding capacitors and stack or layer capacitors, as are known.

Whereas a number of publications are available for flat-pressed winding capacitors and the production thereof, thus obviating the need to give a precise reference to publications, stack or layer capacitors in accordance with the present invention and the production thereof, are described, for example, in German Pat. No. 1 764 541 (corresponding to U.S. Pat. Nos. 3,670,378 and 3,728,765, incorporated herein by reference). These capacitors have previously been manufactured in very large numbers (up to or above one million per day) and are also commercially available.

Another form of stack or layer capacitors to which the present invention likewise relates, are described in German Patent Application No. P 33 42 329.6, incorporated herein by reference. In contrast to other conventional stack or layer capacitors, these capacitors are bifilar and are thus low in induction. A capacitor of this type is illustrated in the attached FIG. 3 and will be explained in the description of the drawings.

The known electric capacitors which have polyethylene terephthalate as dielectric have proven themselves extensively in practice on account of the particularly good dielectric and electric properties of this dielectric.

However, if such capacitors are to be attached as a chip component to the circuit boards of printed circuits, difficulties occur since the heat of the liquid solder, which reaches temperatures of a maximum of 260° C., and which the capacitors indirectly or directly contact for a period of ten seconds, results in changes in the dielectric, such as for example considerable additional shrinkage, deformation of the capacitor body, breaking-off of the applied metal layers, and a change of the dielectric behavior (loss factor, dielectric constant), so that previously it was impossible to use such capacitors as chip components. In such cases it was necessary to use capacitors having a ceramic dielectric, or else to provide that capacitors having a synthetic dielectric were protected from the effects of heat in a special and structurally elaborate manner.

In the production of stack or layer capacitors on a drum, further problems occur since when a plurality of parent capacitors (rings) are wound one above another onto the drum, the winding pressure reduces from the inside towards the outside. Also, during the tempering of the capacitors for purposes of compacting, the innermost parent capacitors (rings) are subjected to an increased pressure produced by the shrinking process. As a result of the lower pressure in the compacted starting capacitor the outer parent capacitors exhibit lower capacitances—which in part are substantially lower—than for example the innermost parent capacitor. These deviations can amount to up to 20%. These difficulties occur mainly when very thin dielectric layers are used, for example, those having a thickness of 3 $\mu$m and less. In order to compensate the lower capacitance of individual capacitors produced from outer parent capacitors, the previous practice has been to make such capacitors longer when they are separated from the parent capacitor.

SUMMARY OF THE INVENTION

An object of the present invention is to provide an electric capacitor which is less susceptible to heat, in particular when used as a chip component, whose application temperature range can reach temperatures of up to 200° C., and in the production of which as a stack or layer capacitor the differences in capacitance values between inner and outer rings can be reduced to a minimum or where possible entirely eliminated. A further object of the invention is to provide methods for the production of such capacitors.

For the realization of this object, the electric capacitor of the type described in the introduction has a degree of crystallization of the dielectric layers formed of polyethylene terephthalate which amounts to at least 50%, and in particular at least 55%, measured by differential thermo-analysis to determine the melting point enthalpy.

The method of determining the melting point enthalpy by differential thermo-analysis is sufficiently known and in general use.

In accordance with the invention, a capacitor of this kind is used in particular as a chip component which can be attached by soldering to circuit boards of printed circuits and is exposed to the heat of the liquid solder, which reaches a maximum temperature of 260° C., for a period of approximately 10 seconds.

In a method for the production of a flat-pressed winding capacitor in accordance with the invention, the flat winding provided with the metal layers is subjected to additional heat treatment in which the temperature is increased from room temperature to a final temperature of 200° to 250° C. for a period of 1 to 5 hours. This final temperature is held for a period of 1 to 65 hours where the length of this holding time is inversely proportional to the final temperature, so that the desired degree of crystallization of at least 50% is achieved.

In the method for the production of a stack or layer capacitor of the invention, the separated individual capacitors are subjected to an additional heat treatment in which the temperature is increased from room temperature to a final temperature of 200° to 250° C. for a period of 1 to 5 hours, where the length of the holding time is inversely proportional to the final temperature so that the desired degree of crystallization of at least 50% is achieved.

Preferably the heat treatment is carried out in an inert shield gas (nitrogen, argon, helium) atmosphere or in a vacuum.

It is also advantageous that the hold time during the heat treatment should amount to approximately 2 hours and the final temperature should amount to approximately 249° C. whereby a degree of crystallization of more than 50% is achieved.

For the production of the capacitors known per se, strips of polyethylene terephthalate foil which have a starting crystallization degree of approximately 40% is used. This degree of crystallization is increased either not at all or only inconsequentially by the pre-shrinkage during the shaping of the flat-pressed winding or during the compacting of the starting capacitor, composed of a plurality of parent capacitors, on the drum under the influence of heat. This proportion of crystallites in the synthetic dielectric permits good processing thereof on account of its particular flexibility. If the degree of crystallization prior to processing were increased to 50% and more, processability becomes difficult or can no longer be guaranteed.

On the other hand, too low a degree of crystallization in the finished capacitor means that the influence of heat during the soldering process, when the capacitor is used as a chip component, results in a sudden shrinkage which leads to the above-described disadvantages, in particular when the solder reaches temperatures of up to 260° C. and the soldering process, as is usual, lasts for 10 seconds.

Surprisingly it has been established that as a result of the additional heat treatment and the increase in the degree of crystallization thereby achieved, the dielectric layers in the capacitor acquire a crystal structure which withstands a sudden shrinkage process. Furthermore, the heat treatment is carried out practically up to only 1 or 2 degrees below the melting temperature of the polyethylene terephthalate. The relatively slow heating to this temperature and the maintenance of this temperature results in a structure which withstands the sudden influence of heat during the soldering process.

In the production of stack or layer capacitors on a drum, a further special advantage is that the capacitance tolerance which is dependent upon the position of the parent capacitor in the starting capacitor virtually disappears. This advantage means that individual capacitors of practically identical length can be separated both from parent capacitors in the vicinity of the drum and from parent capacitors in the outer layers, so that virtually identical or usually even identical capacitances are obtained from equal volumes. As explained above, this was not previously the case since it was always necessary for capacitors from outer layers to be somewhat longer than capacitors from inner layers.

Surprisingly, a further advantage is that the loss factor which, in known capacitors without additional heat treatment was in the region W of between $4 \times 10^{-3}$ and $5 \times 10^{-3}$ at 1 kHz, is now reduced to approximately half, i.e. the loss factor amounts to approximately $2 \times 10^{-3}$ to $3 \times 10^{-3}$.

To provide a protection from chemical influences resulting from the soldering flux and cleansing agents which are necessary for the assembly of layered circuits, the capacitors can be provided with a casing which leaves the soldering surfaces exposed. It is particularly advantageous to use the heat-treated capacitor bodies of the present invention as chip components if they are provided with current supply lines and a casing as described in the German Patent application No. P 34 12 492.6, filed Apr. 3, 1984.

BRIEF DESCRIPTION OF THE DRAWINGS

FIGS. 4, 5, and 6 illustrate, by way of an example, the arrangement of the coatings on the dielectric layers;

FIG. 7 is a temperature-time diagram for the additional heat treatment;

FIG. 8 is a diagram representing the dependence of the capacitance upon the position of the parent capacitor in the starting capacitor;

DESCRIPTION OF THE PREFERRED EMBODIMENTS

Figure 1:
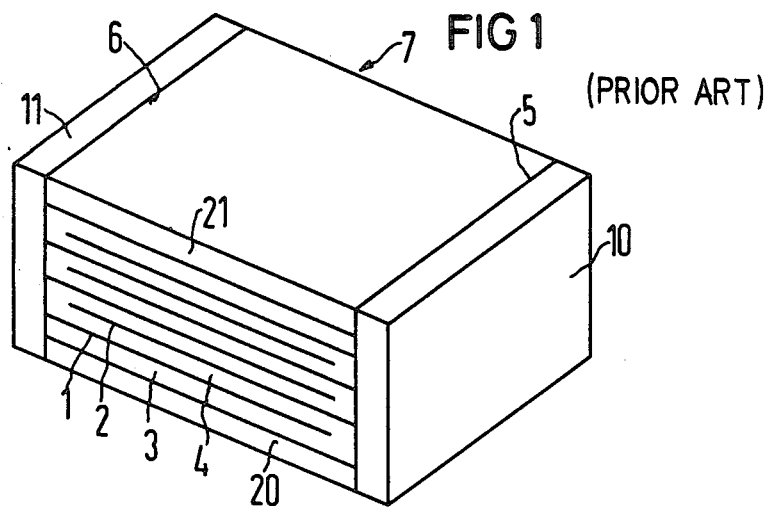
FIG. 1 illustrates a stack or layer capacitor of conventional construction.

FIG. 1 represents the capacitor body 7 as a stack or layer capacitor. The capacitor body 7 is formed of dielectric layers 3 and 4 arranged one above another and which are provided, at least on one side, with metal layers serving as coatings 1 and 2.

Metal layers 10 and 11 are applied to the end faces 5 and 6 of the capacitor body 7, for example, by the Schoop process known per se, and these metal layers serve to electrically connect to one another the metal coatings 1 and 2 which extend alternately into the end faces 5 and 6.

FIG. 1 also shows the covering layers 20 and 21 which are either formed by the intermediate layers during production or are applied to the parent capacitors as additional winding layers.

Figure 2:
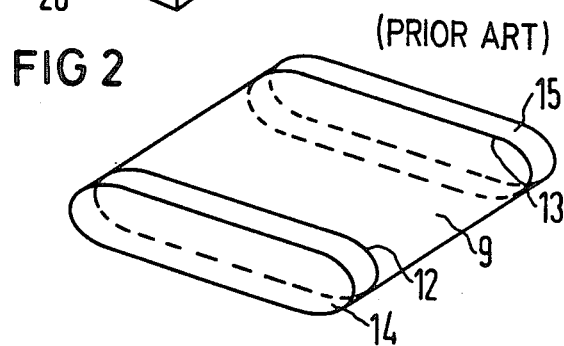
FIG. 2 illustrates a capacitor with a flat-pressed winding as a capacitor body.

FIG. 2 shows an electric capacitor whose capacitor body 9 has been represented as a flat-pressed winding. This capacitor also contains the metal coatings (which are not shown in FIG. 2) which extend alternately to the end faces 12 and 13 to which metal layers 14 and 15 are applied for purposes of electrical connection and for external contacting.

FIG. 4 schematically illustrates that the coatings 1 and 2 are applied only to one side of each dielectric layer 3 and 4.

FIG. 5 illustrates that the dielectric layers 3 are provided on both sides with metal layers 1 and 2, where the metal coating 1 extends towards the left-hand end side and the metal coating 2 extends towards the right-hand end side where they are electrically connected to one another by the metal layers 10 and 11. The dielectric layers 4 have no metal layers but are dielectrically active as they are arranged in the field space.

FIG. 6 illustrates dielectric layers which are likewise provided on both sides with metal coatings, where, however, identically poled coatings 1 and 2 contact one another. The identically poled coatings 1 and 2 of the individual dielectric layers are electrically conductively connected to one another by the metal layers 10 and 11.

The methods of winding metallized foils represented in FIGS. 4 to 6 are known per se. Separate protection for these embodiments is not claimed.

Figure 3:
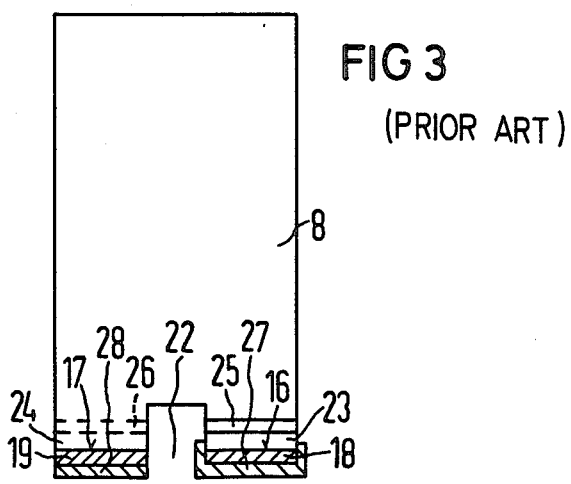
FIG. 3 illustrates a stack or layer capacitor with a bifilar arrangement of the electrodes.

The stack or layer capacitor illustrated in FIG. 3 described in detail in German Patent Application No. P 33 44 329.6, incorporated herein by reference, is formed of a compacted stack 8 of dielectric layers which are stacked one above another and are each provided with a metal layer as a coating, and on one narrow side possesses an indentation 22 by which the individual dielectric layers acquire projections 23 and 24. On these projections, alternately from layer to layer, the metal coatings are interrupted by insulating strips 25 and 26. Accordingly, the metal coatings which are present on the dielectric layers and on the surfaces formed by the projections 23 and 24 represent, alternately from layer to layer, oppositely poled coatings electrically connected to one another by metal layers 18 and 19 on the end faces 16 and 17 of the projections 23 and 24.

To the metal layers 18 and 19 there are applied either solderable metal layers 27 which engage somewhat over the projections 23 and 24, or solderable metal layers 28 which are only connected to the metal layers 18 and 19. The metal layers 27 and 28 serve to electrically and mechanically connect the capacitor 8, as a chip, to the contact surfaces of the circuit board where the capacitor can be installed either horizontally (metal layers 27) or vertically (metal layers 28).

The above-mentioned publication describes the production process for such capacitors in detail. In these capacitors the arrangement of the coatings is bifilar so that such capacitors are very low in inductance.

The measured results represented in the diagrams were obtained from stack or layer capacitors having a 2 $\mu$m thick polyethylene terephthalate foil and a grid dimensioning of 5 mm.

The diagram in FIG. 7 represents the exponential dependence of the temperature of the heat treatment upon the time duration of the heat treatment. The time in hours is plotted on the abscissa whereas the temperature in °C. is represented on the ordinate. Temperatures and times occurring in the shaped section lead to degrees of crystallization above 50%.

The diagram in FIG. 8 represents the dependence of the capacitance upon the position of the parent capacitor in the starting capacitor in the production of stack or layer capacitors.

The abscissa shows the sequence of the parent capacitors on the drum counting from inside outwardly.

The capacitance in nF is represented on the ordinate.

The curve A shows the starting values of capacitors divided up with equal numbers of layers and equal lengths which thus possess practically the same volumes.

The curve A indicates the starting values prior to the additional treatment. The curve B applies to a heat treatment of 6 hours holding time at 180° C. The curve C applies to a heat treatment of 1.5 hours at 224° C. The curve D applies to a heat treatment of 2 hours at 249° C. Curve D represents the preferred embodiment of the invention.

Curve D clearly shows that, independently of the number of layers of the parent capacitor, capacitors are obtained having an only slightly differing capacitance.

Figure 9:
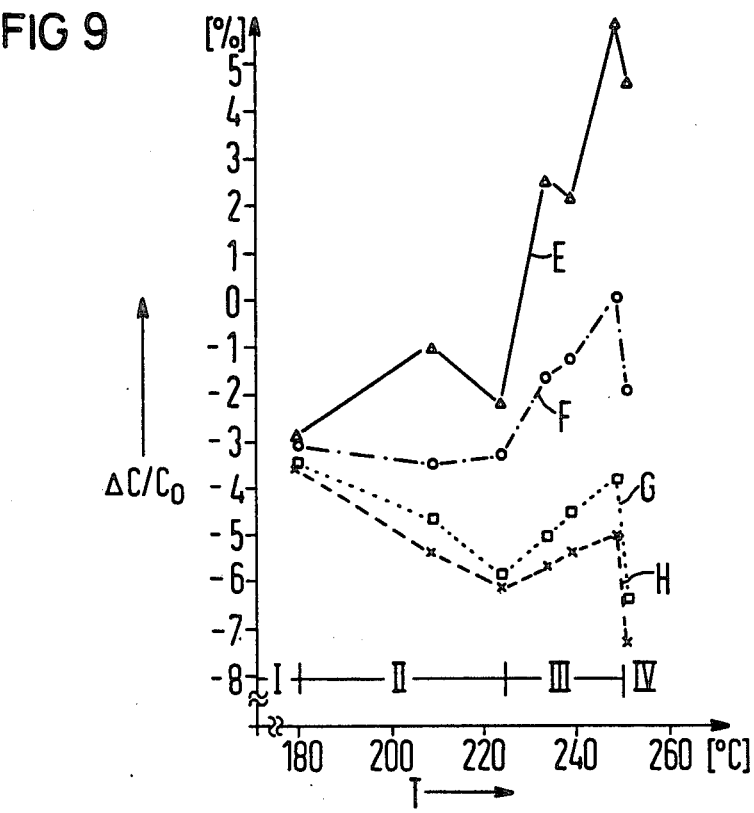
FIG. 9 is a diagram representing the relative change in the capacitance in dependence upon the temperature of the heat treatment.

The diagram in FIG. 9 represents the dependence of the change in capacitance (ordinate) as a result of the additional heat treatment in accordance with the invention. The treatment temperature in °C. is plotted on the abscissa.

The curve E applies to the parent capacitor which was arranged in the eighth position, counted from the inside in the starting capacitor. The curve F applies to the ninth parent capacitor. The curve G applies to the seventh parent capacitor, and the curve H applies to parent capacitors numbers 3 and 5.

The zones shown in roman numerals in the abscissa direction indicate that no change in the crystalline structure occurs in zone I, i.e. at temperatures of up to 180° C. The change in capacitance by approximately 3% in this temperature zone I is due to the drying of the dielectric during the heat treatment.

In the temperature zone II, i.e. at temperatures of 180° to 225° C., a noticeable reduction in the capacitance occurs which is due to a transformation of the crystal structure resulting in a reduction in the dielectric constant.

In the temperature range III, i.e. at temperatures of 225° to 250° C., the capacitance increases since air occlusions are eliminated by the increased shrinkage. These air occlusions are of particular significance in the case of extremely thin foils since not only is the capacitance changed but also during the soldering process, in the case of use as a chip component, these air occlusions also contribute to the flapping up of the capacitor.

In the temperature range IV, i.e. at temperatures above 250° C., a considerable reduction in capacitance occurs due to the melting of the dielectric material.

Figure 10:
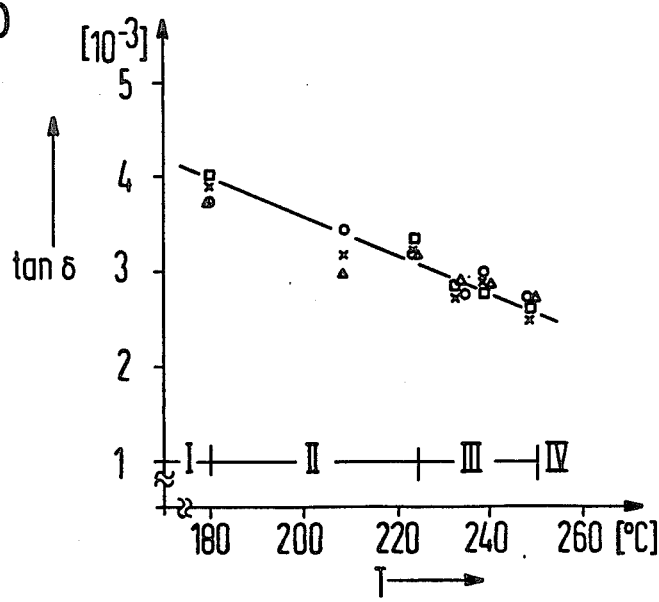
FIG. 10 is a diagram representing the dependence of the loss factor upn the temperature of the heat treatment.

The diagram in FIG. 10 shows the improvement in the loss factor tan (ordinate) in dependence upon the temperature of the heat treatment.

The crosses apply to the parent capacitor located in the fifth position from the inside in the starting capacitor, whereas the squares, triangles, and rings apply to the parent capacitors located in the seventh, eighth, and ninth positions, respectively.

In the temperature range III, a reduction in the loss factors from values around 4 to values around or less than 3 are achieved in comarison to capacitors which have been subjected to no heat treatment or only a slight heat treatment.

Although various minor changes and modifications might be proposed by those skilled in the art, it will be understood that I wish to include within the claims of the patent warranted hereon all such changes and modifications as reasonably come within my contribution to the art.

I claim as my invention:

1. An electric capacitor, comprising:
   dielectric layers provided on at least one side with metal layers as coatings so as to form a capacitor body wherein the dielectric layers are formed of partially crystallized and pre-shrunk polyethylene terephthalate;
   the dielectric layers being arranged to form a stack;
   the coatings being electrically conductively alternately connected to respective metal layers applied to end faces of the capacitor body; and
   the degree of crystallization of the dielectric layers formed of polyethylene terephthalate being at least 50% as measured by differential thermo-analysis in order to determine a melting point enthalpy.

2. An electric capacitor, comprising:
   dielectric layers provided on at least one side with metal layers as coatings so as to form a capacitor body wherein the dielectric layers are formed of partially crystallized and pre-shrunk polyethylene terephtalate;
   the dielectric layers being arranged to form a stack;
   the coatings being electrically conductively alternately connected to respective metal layers applied to end faces of the capacitor body;
   the degree of crystallization of the dielectric layers formed of polyethylene terephthalate being at least 50% as measured by differential thermo-analysis in order to determine a melting point enthalpy; and
   the degree of crystallization being such that significant changes of the dielectric do not occur given a temperature of up to 260° C. for a period of approximately 10 seconds.

3. A method for the production of a capacitor, comprising the steps of:
   providing dielectric layers metallized at least on one side, and forming the dielectric layer of partially crystallized polyethylene terephthalate;
   producing a capacitor body in a form of a round winding;
   deforming the body to form a flat-pressed winding and simultaneously pre-shrinking the winding;
   applying metal layers to the end faces for contacting of coatings arranged alternately on the dielectric layers;
   subjecting the flat windings provided with the metal layers to a heat treatment in which temperature is increased from room temperature to a final temperature of 200° to 250° C. for a period of time of 1 to 5 hours; and
   holding this final temperature for a period of 1 to 65 hours where the length of the holding time is inversely proportional to the final temperature so that a desired degree of crystallization of at least 50% is achieved.

4. A method according to claim 3 including the step of carrying out the heat treatment in a shield gas atmosphere selected from the group consisting of nitrogen, argon, and helium.

5. A method according to claim 3 including the step of carrying out the heat treatment in a vacuum.

6. A method according to claim 3 wherein the holding time in the heat treatment is approximately 2 hours and the final temperature is approximately 249° C. so that a degree of crystallization of more than 50% is achieved.

7. A method for production of a capacitor, comprising the steps of:
   providing strips of polyethylene terephthalate metallized on at least one side and arranged in layers on a drum, and wherein a capacitively non-active intermediate layer is arranged on a plurality of dielectric layers and coatings to form at least one parent capacitor;
   arranging further capacitively active dielectric layers with coatings for a next parent capacitor on said intermediate layer;
   the parent capacitors forming a starting capacitor on the drum which is contacted with end contacting layers;
   tempering the layers on the drum at approximately 150° C. whereby compacting takes place as a result of pre-shrinkage;
   dividing up the starting capacitor into desired individual capacitors at right angles to the intermediate layer;
   subjecting the separated individual capacitors to an additional heat treatment in which the temperature is increased from room temperature to a final temperature of 200° to 250° C. for one to five hours; and
   holding this final temperature for 1 to 65 hours where the length of the holding time is inversely proportional to the final temperature so that a desired degree of crystallization of at least 50% is achieved.

8. A method according to claim 7 including the step of carrying out the heat treatment in a shield gas atmosphere selected from the group consisting of nitrogen, argon, and helium.

9. A method according to claim 7 including the step of carrying out the heat treatment in a vacuum.

10. A method according to claim 7 wherein the holding time in the heat treatment is approximately two hours, and the final temperature is approximately 249° C. so that a degree of crystallization of more than 50% is achieved.

11. A method for production of a capacitor, comprising the steps of:
    providing strips of polyethylene terephthalate metallized on at least one side in layers on a drum to form a start capacitor;
    dividing up the starting capacitor into desired individual capacitors at right angles to the layer plane;
    applying metal layers to the individual capacitors for contacting the coatings in alternate fashion;
    subjecting the individual capacitors to a heat treatment in which temperature is increased from room temperature to a final temperature of 200° to 250° C. for a period of time of 1 to 5 hours; and
    holding this final temperature for a period of 1 to 65 hours where the length of the holding time is inversely proportional to the final temperature so that a desired degree of crystallization of at least 50% is achieved.

12. A method for producing an electric capacitor, comprising the steps of:
    providing dielectric layers having on at least one side metal layers as coatings;
    providing the dielectric layers as polyethylene terephthalate;
    electrically contacting the coatings in alternate fashion to respective metal layers; and
    subjecting the dielectric layers to a temperature treatment of 200° to 250° C. for 1 to 5 hours and holding this final temperature for 1 to 65 hours where the length of the holding time is inversely proportional to the final temperature so that a desired degree of crystallization of at least 50% is achieved.

* * * * *